United States Patent [19]

Ishizaka et al.

[11] 4,391,488
[45] * Jul. 5, 1983

[54] MOUNT DEVICE OF AN INTERCHANGEABLE LENS

[75] Inventors: Sunao Ishizaka; Toshiaki Hozumi, both of Tokyo, Japan

[73] Assignee: Nippon Kogaku K.K., Tokyo, Japan

[*] Notice: The portion of the term of this patent subsequent to Feb. 9, 1999, has been disclaimed.

[21] Appl. No.: 177,356

[22] Filed: Aug. 11, 1980

[30] Foreign Application Priority Data

Sep. 11, 1979 [JP] Japan .................. 54/115752

[51] Int. Cl.³ .................. G02B 7/02; G03B 7/20
[52] U.S. Cl. .................. 350/257; 354/24; 354/46; 354/286
[58] Field of Search .................. 350/252, 257; 354/24, 354/29, 43, 46, 60 R, 286

[56] References Cited

U.S. PATENT DOCUMENTS

| | | | |
|---|---|---|---|
| 3,486,434 | 12/1969 | Suzuki et al. | 354/46 |
| 4,192,586 | 3/1980 | Orban | 354/24 |
| 4,312,579 | 1/1982 | Araki | 354/286 |
| 4,314,752 | 2/1982 | Ishizaka et al. | 354/286 |

FOREIGN PATENT DOCUMENTS

| | | | |
|---|---|---|---|
| 2922021 | 12/1979 | Fed. Rep. of Germany | 354/286 |
| 41-12429 | 7/1966 | Japan . | |
| 54-21339 | 2/1979 | Japan | 354/43 |
| 1025953 | 4/1966 | United Kingdom | 354/46 |

*Primary Examiner*—William H. Punter
*Attorney, Agent, or Firm*—Fitzpatrick, Cella, Harper & Scinto

[57] ABSTRACT

In an interchangeable lens having a mount mountable on a camera incuding an electric circuit associated with exposure control and a displaceable actuating member for correcting the electric circuit so as to be accommodated to the focal length of the interchangeable lens mounted, a signal member is provided projectedly from one end of the mount and engageable with the actuating member so as to cause said displacement when the interchangeable lens is mounted on the camera. The signal member has an engaging end portion engageable with the actuating member. The engaging end portion lies at a position determined relative to the mount for displacing the actuating member by an amount related to the logarithm of the focal length of the interchangeable lens.

9 Claims, 5 Drawing Figures

MOUNT DEVICE OF AN INTERCHANGEABLE LENS

BACKGROUND OF THE INVENTION

1. Field of the Invention

This invention relates to a mount device of an interchangeable lens mounted on a camera, and particularly to a mount device capable of transmitting the focal length information of the interchangeable lens to the camera.

2. Description of the Prior Art

For a camera, particularly, a single lens reflex camera, there are usually prepared several types to many types of interchangeable lenses having different focal lengths. When photography is to be effected by the use of these interchangeable lenses, it is sometimes necessary to transmit the focal length information of a mounted lens to the camera in order to obtain more appropriate photographs. Especially, in a camera provided with an electric circuit for metering and operating an object light passed through the lens and determining a combination of shutter speed and aperture value for obtaining a proper exposure, on the basis of a preset program, it is desirable to correct the characteristic of the program by taking the focal length of the interchangeable lens into account. For example, considering the relation between the image magnification and hand vibration, it is desirable in an interchangeable lens haing a long focal length to correct said characteristic to a characteristic having attached importance to a higher shutter speed in order to eliminate the influence of hand vibration.

The technique of transmitting the focal length information of an interchangeable lens to a camera is known from Japanese Patent Publication No. 12429/1966. According to this prior art technique, an interchangeable lens is provided with a signal member comprising a projection having an amount of projection corresponding to the focal length of the lens and, when the lens has been mounted on a camera, the focal length information is transmitted to a camera by said projection. Considering commercially available various interchangeable lenses, there are very many types of interchangeable lenses having relatively short focal lengths such as 8, 10, 15, 16, 20, 24, 28, 35, 45, 50, 55, 85 and 105 mm, whereas there are a few types of interchangeable lenses having long focal lengths such as 200, 300, 400, 500, 1000 and 2000 mm. Accordingly, if the amount of projection of the signal member is selected simply to correspond to the focal length, for example, an amount proportional to the focal length, then the information of many lenses of short focal lengths will be condensed within the range of about 1/20 of the maximum amount of projection of the signal member allowable in designing and thus, the signal reading error on the camera side will become great.

What has been stated above equally applies to a case where an interchangeable lens is equipped with a conversion lens to increase the focal length thereof by M times.

SUMMARY OF THE INVENTION

It is an object of the present invention to provide an improved mount device of an interchangeable lens which transmits the focal length information of the interchangeable lens to a camera.

It is a further object of the present invention to provide an improved mount device of an interchangeable lens which more accurately transmits to a camera the focal length information of interchangeable lenses lying sporadically over a wide range of several millimeters to several thousand millimeters.

The mount device of the interchangeable lens of the present invention has a signal member provided projectedly from one end of the mount of the lens and engageable with the actuating member of a camera when the lens is mounted on the camera, the signal member including one having a signal amount related to the logarithm of the focal length of said lens with respect to a reference position. The thus constructed device of the present invention reduces the focal length information reading error in interchangeable lenses of short focal lengths, and reduces the signal amount of the signal member relative to the reference position in interchangeable lenses of long focal lengths and contributes to preventing cameras from becoming bulky.

The invention will become more fully apparent from the following detailed description thereof taken in conjunction with the accompanying drawings.

DESCRIPTION OF THE PREFERRED EMBODIMENTS

Figure 1:
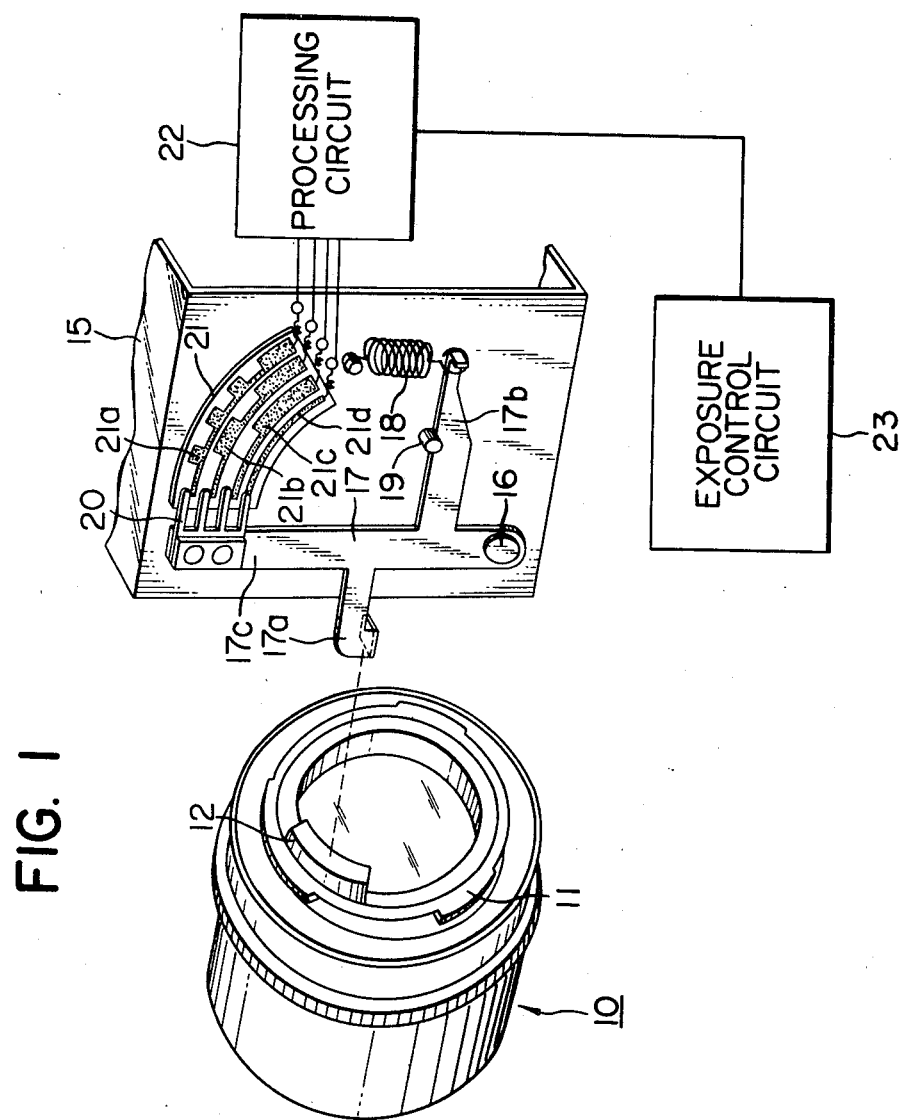
FIG. 1 is a perspective view of a first embodiment of the present invention.

The present invention will be described with respect to embodiments thereof. Referring to FIG. 1, a bayonet type mount 11 is secured to the rear end surface of an interchangeable lens 10 body. A signal member 12 fixed to a fixed cylinder, not shown, projects near the mount 11. This signal member projects by a predetermined amount with respect to a reference surface in accordance with the focal length of the interchangeable lens.

On the other hand, on the camera body side, a mechanism for taking out the focal length information from the signal member 12 is disposed at one side of a mirror box 15. That is, a first arm 17a of an actuating lever 17 rotatably supported by a shaft 16 studded in the mirror box 15 is engageable with the signal member 12. The lever 17 is counter-clockwisely biased by a spring 18, and a position in which a second arm 17b bears against a stop 19 (shown in FIG. 1) is the initial position of this lever 17, namely, the position before the interchangeable lens is mounted. A brush 20 comprising four conductors is secured to a third arm 17c of the lever 17. These four conductors are electrically connected to each other and adapted to slide on three rows of good conductor digital code patterns 21a, 21b, 21c printed on an insulating substrate 21 and a power source line 21d. This brush 20 and digital code patterns 21a, 21b, 21c provide a converting portion for converting the focal length information into a digital signal.

Figure 2:
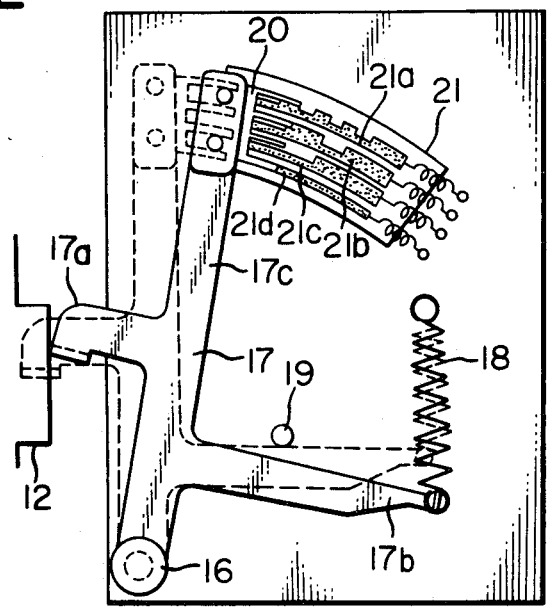
FIG. 2 is a view illustrating the operation of the FIG. 1 embodiment.

Now, when the interchangeable lens 10 is mounted on the camera body, the signal membe 12 bears against the first arm 17a, whereby the actuating lever 17 is clockwisely rotated against the bias of the spring 18. The amount of this rotation corresponds to the amount of projection of the signal member 12, i.e., the focal length information. As a result, the brush 20 also slides on the digital code patterns in accordance with the amount of rotation of the lever 17 and stops at a predetermined position corresponding to the amount of projection of the signal member 12 (this condition is shown by solid lines in FIG. 2). The positional relation between the brush 20 and the code patterns is taken out in the form of a digital electrical signal corresponding to the focal length of the interchangeable lens mounted on the camera and is processed by a processing circuit 22 (FIG. 1), whereafter it is applied as input to a circuit 23 which requires the focal length information. This circuit 23 is a program exposure control circuit as shown in U.S. Pat. No. 3,950,765 and meters the object light and from the result of the metering, determines a combination of shutter speed and aperture value to be controlled on the basis of a preset program, and is designed to correct the characteristic of the program so that a combination optimal to the interchangeable lens mounted on the camera can be obtained from the focal length information put out from the processing circuit 22.

In the above-described manner, the focal length information is transmitted from the interchangeable lens to the camera, and the signal members of interchangeable lenses lying sporadically in the focal length range of several millimeters to several thousand millimeters are each installed as follows. That is, the amont of projection of the signal member with respect to a predetermined reference surface is set in relation to the logarithm of the focal length of the interchangeable lens. Specifically, it is caused to be proportional to the logarithm of the focal length or the logarithm of the inverse number of the focal length.

Figure 3:
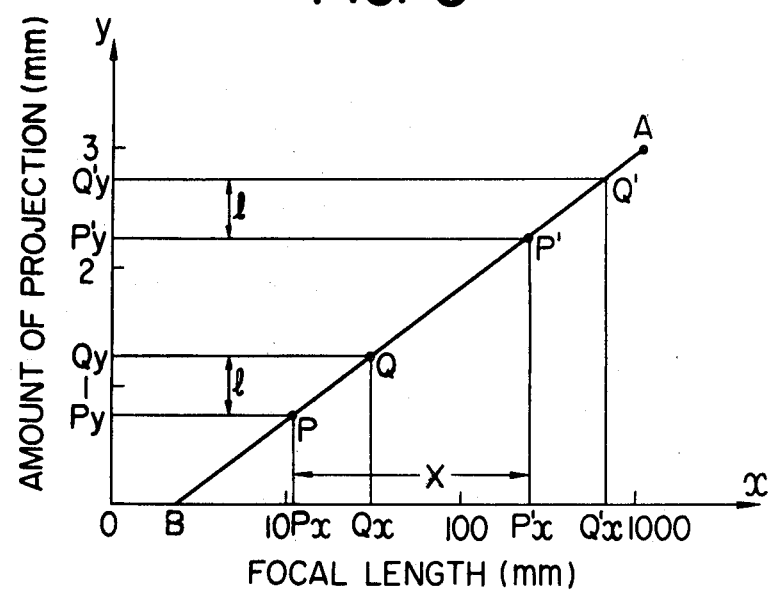
FIG. 3 is a graph showing the relation between the focal length of an interchangeable lens and the amount of projection of the signal member.

In FIG. 3 wherein the ordinate represents the amount of projection of the signal member of the interchangeable lens and the abscissa of logarithm scale respresents the focal length of the interchangeable lens, a point A shows the point of intersection between the maximum amount of projection of the signal member that is allowed in designing and the maximum focal length of the interchangeable lens whose focal length information must be transmitted to the camera, and a point B shows the point of intersection between the minimum amount of projection of the signal member and the minimum focal length of the interchangeable lens. Accordingly, the gradient of the straight line AB can be arbitrarily selected in designing. The straight line between these two points represents the focal length of each interchangeable lens and the amount of projection of the signal member. This amount of projection just corresponds to the amount of movement of the first arm 17a. Now, when these two points are defined as $A(x_1, y_1)$ and $B(x_2, y_2)$, the equation of the straight line AB becomes $$y - y_1 = \frac{y_2 - y_1}{\log x_2 - \log x_1} (\log x - \log x_1)$$

Here, arbitrary two points $P(Px, Py)$ and $Q(Qx, Qy)$ corresponding to the focal lengths of two interchangeable lenses different in type are inscribed on the straight line AB, provided that $Qx = MPx$ and $Qy - Py = 1$.

Next, an arbitrary point P' is selected on the straight line AB and the x-co-ordinates thereof are determined as $(P'x = Px + X)$ and the y-co-ordinates corresponding thereto are determined as $(P'y)$. A point on the straight line AB which has y-co-ordinates $(Q'y = P'y + 1)$ which are the sum of said y-co-ordinates $(P'y)$ and said 1 and x-co-ordinates $(Q'x)$ corresponding thereto is defined as Q'. Then, $$Q'y - P'y = m(\log Q'x - \log x_1) - m(\log P'x - \log x_1)$$
$$= m \log \frac{Q'x}{P'x}$$
$$= 1$$

(where m is the gradient of the straight line AB and expressed as $$\frac{y_2 - y_1}{\log x_2 - \log x_1} .$$

Hence, $$\log \frac{Q'x}{P'x} = \frac{1}{m} \quad (1)$$

Since $Qx = MPx$, $$Qy - Py = 1$$
$$= m \log \frac{Qx}{Px}$$
$$= m \log M.$$

Next, $1/m = \log M$ and if this is substituted for equation (1), $$\frac{Q'x}{P'x} = M. \quad (2)$$

Consequently, the difference in the amount of projection of the signal member when the focal length has been increased by M times for an arbitrary point on the straight line AB for a certain focal length is constant between any interchangeable lenses. Therefore, even if the amount of projection of the signal member 12 is related to the logarithm of the focal length, there will occur no obstruction to the information transmission between the interchangeable lens and the camera body. In addition, the amount of projection of the signal member 12 varies to 1 mm, 2 mm and 3 mm in FIG. 3 as the focal length becomes 10 mm, 100 mm and 1000 mm and thus, the amount of projection on the short focal length side is relatively enlarged, as a result of which the focal length information reading errors of various interchangeable lenses whose focal lengths lie sporadically in the range of 10–100 mm are reduced.

Description will now be made of a second embodiment in which the present invention is applied to a case where a rear conversion lens for converting the focal length of the interchangeable lens is mounted between the interchangeable lens and the camera. In this case, the interchangeable lens and the rear conversion lens can be considered to be a unitary interchangeable lens.

The following description will be made with the understanding that the interchangeable lens 10 has a focal length as represented by a point P in FIG. 3 and when equipped with a rear conversion lens, it comes to have a focal length as represented by a point Q in FIG. 3.

Figure 4:
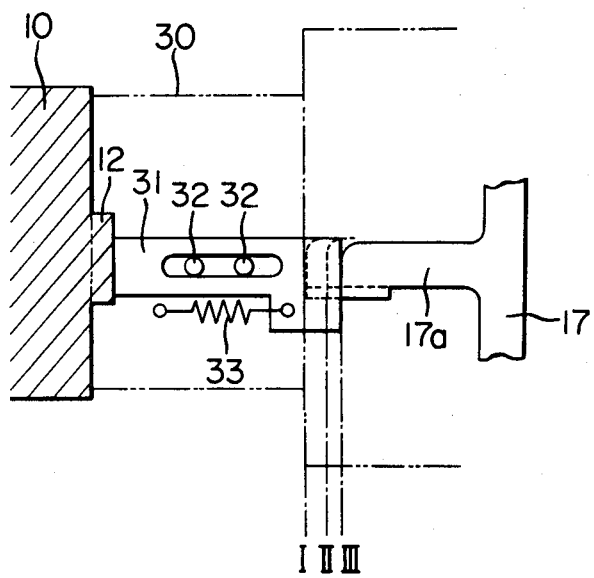
FIG. 4 illustrates a second embodiment of the present invention in which the interchangeable lens is equipped with a rear conversion lens.

In FIG. 4, the amount of projection of the signal member 12 of the interchangeable lens 10 is increased by M times by an intermediate lever 31 disposed on the barrel portion of a rear conversion lens 30 having a mount similar to that of the interchangeable lens 10 and is transmitted to the first arm 17a of the lever 17 on the camera side. The intermediate lever 31 is slidably supported by fixed pins 32 and leftwardly biased by a spring 33 as viewed in the Figure.

In FIG. 4,

I show the reference position of the first arm 17a when no lenses mounted,

II shows the position of the first arm 17a when the lens 10 has been mounted on the camera body, and III shows the position of the first arm 17a when an M-times rear conversion lens 30 has been mounted.

The difference between the position III and the position II is the variation in magnification (variation in focal length) resulting from the mounting of the rear conversion lens.

In this manner, between the first arm 17a and the intermediate lever 31, the focal length information of the interchangeable lens 10 is increased by M times through the M-times rear conversion lens and transmitted. Therefore, Qx=MPx is established in FIG. 3, and so, in FIG. 4, the difference between the amount of projection of the signal member when the interchangeable lens 10 is a single piece and the amount of projection of the intermediate lever 31 when the interchangeable lens 10 has been equipped with the rear conversion lens is also equal between any interchangeable lenses.

Figure 5:
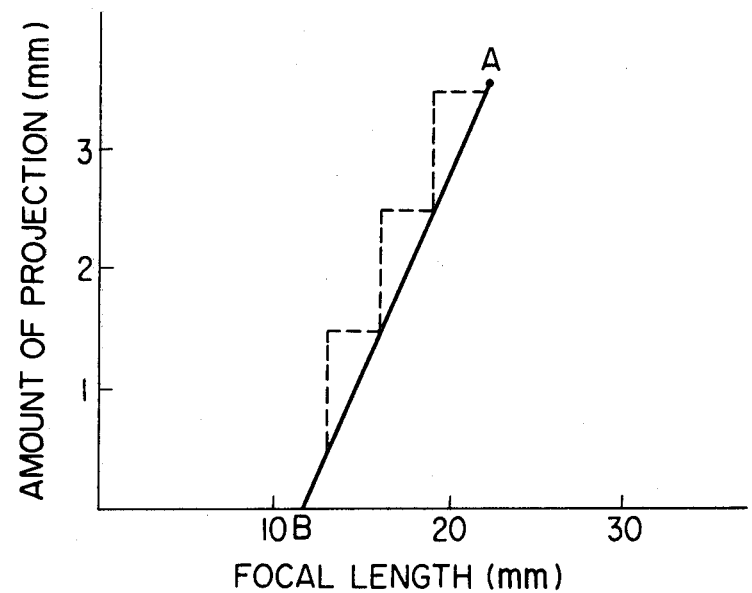
FIG. 5 is a graph similar to FIG. 3 but illustrating a third embodiment of the present invention.

A third embodiment of the present invention will be described with refernce to the graph of FIG. 5. This embodiment is one in which interchangeable lenses whose focal lengths are approximate to one another are divided into several small groups (for example, divided into focal lengths 6 mm–10 mm; 15 mm–24 mm; . . . ) and a signal member having an amount of projection common to the interchangeable lenses of these small groups is installed. Of course, the amount of projection of this signal member exists on the straight line AB of FIG. 5 (which it should be understood is the same as the straight line AB of FIG. 3). By doing so, for example, in lenses having the danger of hand vibration such as interchangeable lenses having the focal lengths of 200 mm–500 mm, there is provided little effect even if the previously described program characteristics are individually changed and therefore, rather with regard to these interchangeable lenses, setting a program characteristic as an undivided whole would lead to a result more preferable in terms of the circuit construction or photography.

The signal member 12 is not restricted to the amount of projection from the reference position, but there are various modes such as the rotational angle from the reference position.

Also, in a zoom lens, the focal length is varied by zooming and therefore, it is also possible to cause the amount of projection to correspond to the logarithm of each focal length by projecting or retracting the signal member in accordance with the zooming.

We claim:

1. In a lens system comprising an interchangeable lens having a mount mountable on a camera having an electric circuit associated with exposure control and a displaceable actuating member for correcting said electric circuit so as to be accommodated to the focal length of the interchangeable lens mounted, and a conversion lens having an optical system for converting the focal length of said interchangeable lens and mountable between said interchangeable lens and the camera, the improvement comprising:

a signal member provided on said interchangeable lens projectedly from one end of said mount and engageable with said actuating member so as to close said displacement when said interchangeable lens is mounted on the camera through said mount, said signal member having an engaging end portion engageable with said actuating member, said engaging end portion lying at a position determined relative to said mount for displacing said actuating member by an amount proportional to the logarithm of the focal length of said interchangeable lens; and a transmission member provided on said conversion lens and positioned between said signal member and said actuating member when said conversion lens is mounted, said transmission member being slidable by said signal member by an amount corresponding to the position of said engaging end portion and displacing said actuating member by an amount proportional to the logarithm of said focal length converted in response to said sliding and the mounting of said conversion lens onto the camera.

2. A lens system according to claim 1, wherein said conversion lens has a mount mounted on the camera and said transmission member includes:

a lever having one end engageable with the engaging end portion of said signal member and the other end engageable with said actuating member, said lever being slidable so that said other end is displaced from its initial position by the engagement of said one end with said engaging end position, the initial position of said other end being a position determined relative to the mount of said conversion lens by an amount corresponding to the difference between an amount proportional to the logarithm of the focal length of said interchangeable lens and an amount proportional to the logarithm of said converted focal length.

3. A lens system according to claim 2, wherein said transmission member further includes means for biasing said lever toward one end.

4. A camera system including a camera body having a program exposure control device which is so programmed that a combination of shutter speed and aperture value may be determined according to the brightness of the object to be photographed and film speed; and an interchangeable lens having a mount mountable on said body, comprising:

(a) program varying means provided in said program exposure control device, the program of said program exposure control device being capable of being selected by the setting of said program varying means;

(b) signal means for indicating a class of said interchangeable lens classified in relation to the focal length, said signal means being provided on said interchangeable lens and having a mechanical characteristic related to the logarithm of the focal length of said interchangeable lens; and (c) interlock means provided on said body for setting said program varying means in response to said signal means so that when said interchangeable lens is mounted onto said body, said program varying means selects a program corresponding to the class of said lens.

5. A camera system according to claim 4, wherein said interlock means includes a movable member and said signal means has a signal member provided projectedly from one end of said mount and engageable with said movable member.

6. A camera system according to claim 5, wherein said signal member has an engaging end portion engageable with said movable member, said engaging end portion lying at a position determined relative to said mount by said mechanical characteristic.

7. A camera system according to claim 6, wherein the position of the engaging end portion of said signal member is determined so as to displace said movable member by an amount proportional to the logarithm of the focal length of said interchangeable lens.

8. An interchangeable lens for use in combination with said camera system according to claim 4, which comprises a signal member provided projectedly from one end of said mount and having an end portion lying at a position determined relative to said mount by a mechanical characteristic related to the logarithm of the focal length of said interchangeable lens.

9. In a camera system including a camera body having a program exposure control device which is so programmed that a combination of shutter speed and aperture value may be determined according to the brightness of the object to be photographed and film speed, and an interchangeable lens having a mount mountable on said body, an apparatus for correcting the characteristic of said program comprising:

(a) program varying means provided in said program exposure control device, the program of said program exposure control device being capable of being selected by the setting of said program varying means;

(b) signal means for indicating a class of said interchangeable lens classified in relation to the focal length, said signal means being provided on said interchangeable lens and having a mechanical characteristic related to the logarithm of the focal length of said interchangeable lens; and (c) interlock means provided on said body for setting said program varying means in response to said signal means so that when said interchangeable lens is mounted onto said body, said program varying means selects a program corresponding to the class of said lens.

* * * * *

UNITED STATES PATENT AND TRADEMARK OFFICE
CERTIFICATE OF CORRECTION

PATENT NO. : 4,391,488
DATED : July 5, 1983
INVENTOR(S) : SUNAO ISHIZAKA, ET AL.

It is certified that error appears in the above-identified patent and that said Letters Patent is hereby corrected as shown below:

Column 1, line 30, "haing" should be --having--;

Column 5, line 35, "refernce" should be --reference--;

Column 6, line 10, "close" should be --cause--;

line 37, "position" should be --portion--.

Signed and Sealed this

Twentieth Day of September 1983

[SEAL]

Attest:

GERALD J. MOSSINGHOFF

Attesting Officer     Commissioner of Patents and Trademarks